F. C. WRIGHT.
SCOOP BALANCE SCALE.
APPLICATION FILED AUG. 26, 1912.

1,080,398.

Patented Dec. 2, 1913.

WITNESSES:

INVENTOR.
Frank C. Wright
BY
Sturtevant & Mason
ATTORNEYS.

UNITED STATES PATENT OFFICE.

FRANK C. WRIGHT, OF ST. JOHNSBURY, VERMONT, ASSIGNOR TO E. AND T. FAIRBANKS & COMPANY, OF ST. JOHNSBURY, VERMONT, A CORPORATION OF VERMONT.

SCOOP-BALANCE SCALE.

1,080,398. Specification of Letters Patent. Patented Dec. 2, 1913.

Application filed August 26, 1912. Serial No. 717,046.

*To all whom it may concern:*

Be it known that I, FRANK C. WRIGHT, a citizen of the United States, residing at St. Johnsbury, in the county of Caledonia, State of Vermont, have invented certain new and useful Improvements in Scoop-Balance Scales, of which the following is a description, reference being had to the accompanying drawing and to the figures of reference marked thereon.

My invention relates to an improvement in weighing scales, and particularly to a scoop balance therefor.

In the common form of scoop balance scale for counter use in stores the articles to be weighed usually rest on a round plate. A scoop may be used with the base or hoop resting on this plate, but must be counterbalanced by a weight on the counterpoise. This balance weight is apt to be mislaid or may be fraudulently omitted and therefore this type of scale has been condemned by the sealers' regulations of several of the States and is not approved by the Bureau of Standards.

The object, therefore, of my invention is to provide a scale on which objects cannot be weighed except in the scoop, which is especially adapted to rest in a support formed therefor and which, nevertheless, is so constructed that it can be set upon a counter to be filled and yet when used on the scale no balance weight will be required.

The invention, therefore, consists in the matters hereinafter described and referred to in the appended claim.

The invention is illustrated in the accompanying drawings, in which—

Figure 1:
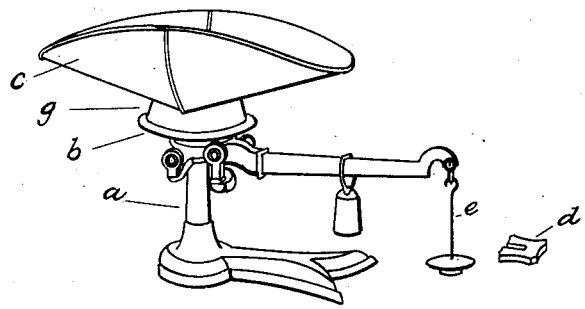
Figure 2:
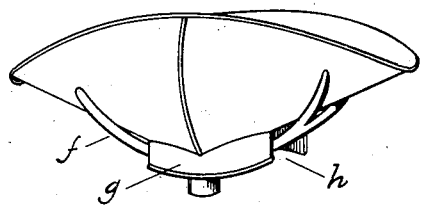
Figure 3:
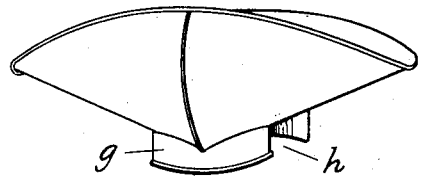
Figure 4:
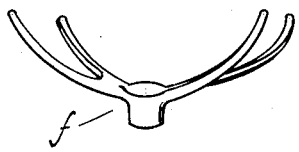

Figure 1 is a front elevation of a common form of scoop balance scale. Fig. 2 is a front view of my improved scoop and supporting fork therefor. Fig. 3 is a similar view of the scoop alone, and Fig. 4 is a similar view of the fork alone.

In these drawings and referring first to Fig. 1, *a* is the scale as a whole, of common design having the round plate *b*, on which articles may be weighed. A scoop *c* may be used, with its base or hoop *g*, resting on the plate, but must be counterbalanced by a weight *d* on the counterpoise *e*. The objections to this have been heretofore pointed out. As shown in the remaining figures of the drawing, instead of a flat plate *b*, a fork *f* is preferred, shown in detail in Fig. 4. It is of shape, so that articles cannot be weighed except in a scoop especially adapted to rest therein and which forms a part of the scale. It is desirable, however, to retain the hoop *g*, as it permits the scoop to be placed on a counter or other level surface and the main feature of this invention is to so construct this hoop or base as to permit the scoop to be used with the hoop *f* in conformity with the law and at the same time not to interfere with common custom in placing the scoop on the counter for filling. This is accomplished by making the hoop *g* in two parts as shown in Fig. 3 with the space *h* between so that the hoop may straddle the fork as shown in Fig. 2. This can be used upon a specially constructed fork, or upon one of standard construction.

It will be understood that I do not wish to be limited to the exact construction of the hoop or base, as shown in the drawing, as changes may be made without departing from the spirit of the invention.

I claim:

In a scoop balance scale the combination with the scale fork or cross, of a scoop having its bottom portion formed to fit said cross and having also downward projections with a space between, to straddle the fork or cross.

In testimony whereof, I affix my signature, in the presence of two witnesses.

FRANK C. WRIGHT.

Witnesses:
PERLEY F. HAZEN,
RAYMOND A. PEARL.

Copies of this patent may be obtained for five cents each, by addressing the "Commissioner of Patents, Washington, D. C."